US 6,728,450 B2

(12) United States Patent
Tombling et al.

(10) Patent No.: US 6,728,450 B2
(45) Date of Patent: Apr. 27, 2004

(54) ALIGNMENT OF OPTICAL FIBERS WITH AN OPTICAL DEVICE

(75) Inventors: Craig Tombling, Stadhampton (GB); Stephen James Fasham, Bedfordshire (GB)

(73) Assignee: Kamelian Limited, A Body Corporate, Oxford (GB)

( * ) Notice: Subject to any disclaimer, the term of this patent is extended or adjusted under 35 U.S.C. 154(b) by 193 days.

(21) Appl. No.: 10/112,393

(22) Filed: Mar. 29, 2002

(65) Prior Publication Data

US 2002/0154866 A1 Oct. 24, 2002

(30) Foreign Application Priority Data

Apr. 2, 2001 (GB) .............................. 0108204
Nov. 28, 2001 (GB) .............................. 0128565

(51) Int. Cl.[7] .............................................. G02B 6/26
(52) U.S. Cl. .............................. 385/52; 385/49; 385/88
(58) Field of Search .............................. 385/49, 50, 52, 385/59, 65, 71, 83

(56) References Cited

U.S. PATENT DOCUMENTS

| 4,744,619 A | * | 5/1988 | Cameron | ...................... 385/52 |
| 4,767,174 A | | 8/1988 | Carenco et al. | ............. 350/96.2 |
| 5,379,360 A | | 1/1995 | Ota et al. | ...................... 385/59 |
| 5,613,024 A | * | 3/1997 | Shahid | ........................ 385/52 |
| 5,787,214 A | * | 7/1998 | Harpin et al. | ................. 385/49 |
| 5,818,994 A | | 10/1998 | Hehmann | .................... 385/89 |
| 5,889,914 A | | 3/1999 | Gentsu | ....................... 385/137 |
| 5,926,594 A | * | 7/1999 | Song et al. | ................... 385/49 |
| 6,115,521 A | * | 9/2000 | Tran et al. | ..................... 385/52 |
| 6,212,320 B1 | * | 4/2001 | Rickman et al. | .............. 385/52 |
| 6,438,297 B1 | * | 8/2002 | McKenzie | .................... 385/49 |
| 6,633,706 B2 | * | 10/2003 | Park | ............................ 385/49 |

FOREIGN PATENT DOCUMENTS

| EP | 222 439 | 5/1987 |
| EP | 504 882 | 9/1992 |
| EP | 629 888 | 6/1993 |
| EP | 566 900 | 10/1993 |
| EP | 798 579 | 1/1997 |
| JP | 08-199278 | 2/1998 |
| WO | WO 86/02172 | 4/1986 |

OTHER PUBLICATIONS

Copy of European Search Report for GB 0108204.9.
Copy of PCT Search Report for PCT/GB02/01474.
Lai, Q., W. Hunziker, and H. Melchoir; Silica on Si waveguides for self–aligned fibre array coupling using flip–chip Si V–groove technique; Sep. 1996; Electronics Letters, vol 32, No. 20.

* cited by examiner

Primary Examiner—Phan T. H. Palmer
Assistant Examiner—Jennifer Doan
(74) Attorney, Agent, or Firm—Glenn Patent Group; Michael A. Glenn (57) ABSTRACT

A method of aligning the end of an array of optical fibers 27, such as ribbon fiber, with waveguides 33 in an optical device 31, such as an active semiconductor optical device. The ends of the optical fibers 27 are mounted in grooves 25 in a grooved surface 23 of a first block 21 of a fiber block assembly 20. A second block 22 is mounted to the grooved surface 23 of the first block 21 with the fibers 27 mounted between the blocks 21, 22. The grooved surface 23 of the first block 21 extends beyond the second block 22 to form guide surfaces 30. The optical device 31 is supported on a support surface 36 of a bench 32 having guide surfaces 37 extending from the support surface 36.

55 Claims, 5 Drawing Sheets

ALIGNMENT OF OPTICAL FIBERS WITH AN OPTICAL DEVICE

FIELD OF INVENTION

The present invention relates to the alignment and optical coupling of the end of an array of optical fibres, such as in ribbon fibre, with waveguides in an optical device, such as an active semiconductor optical device or a passive device.

DISCUSSION OF RELATED ART

Optical fibres are commonly used to interconnect optical devices of various forms, including passive waveguide structures in silica and silicon and active semiconductor devices. Attaching optical fibres to optical devices is a technical challenge, particularly when attaching an array of optical fibres, for example in the form of ribbon fibre.

Figure 1:
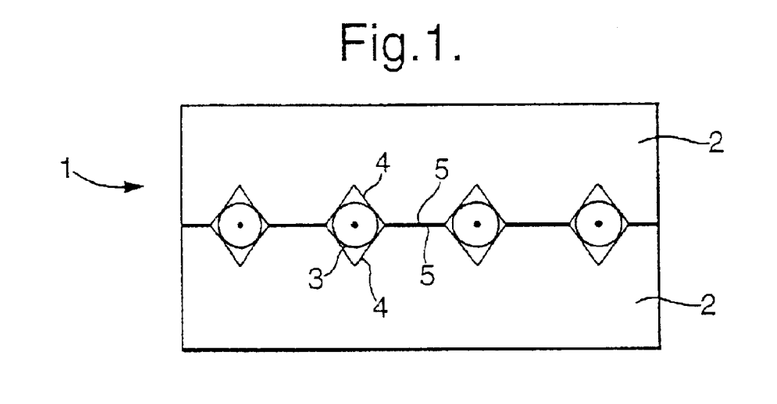
FIG. 1 is an end view of a known fibre block.

A well known way of attaching ribbon fibre to a passive, multi-channel optical device, for example an arrayed waveguide grating (AWG), involves mounting the end of the ribbon fibre in a fibre block assembly. FIG. 1 is an end view of a known form of fibre block assembly 1 comprising two blocks 2 bonded together. An array of fibres 3 are mounted between the two blocks 2 in arrays of v-grooves 4 formed in the opposed bonded surfaces 5 of the blocks 2. The fibre block assembly 1 serves to fix the relative positions of the fibres 3 in the array to a tolerance of, say, around ±0.5 µm. The end surface of the fibre block assembly 1 is usually polished to an optical surface, either at normal incidence to the optical axes of the fibres or at an angle, if required.

Figure 2:
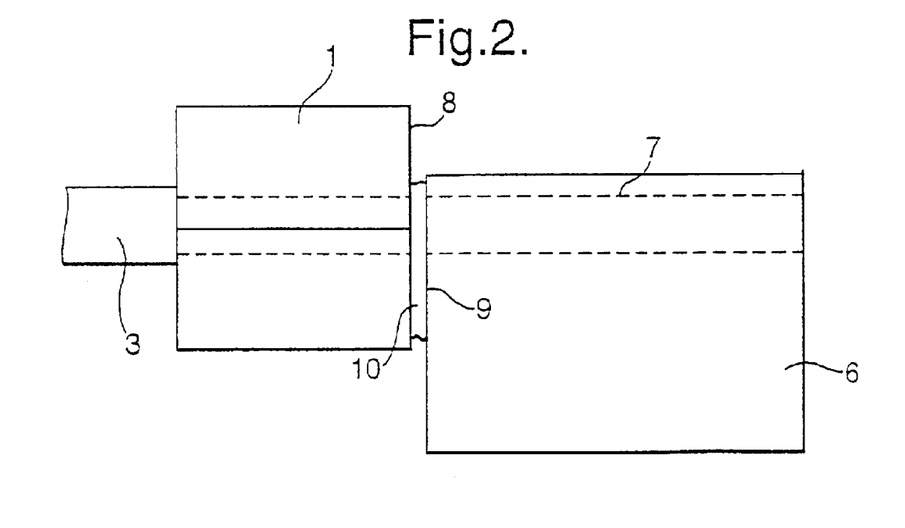
FIG. 2 is a side view of a fibre block butt coupled to an optical device.

A known way of using the fibre block assembly 1 of FIG. 1 to couple the optical fibres 3 to a passive optical device such as an AWG is known as "butt coupling". FIG. 2 is a side view illustrating the fibre block assembly 1 butt coupled to a passive optical device 6 in which there are waveguides 7. The polished end surface 8 of the fibre block assembly 1 and the polished surface 9 of the optical device 6 are brought into contact, or close proximity, commonly with a thin layer of optically clear adhesive 10 at the interface between the fibre block assembly 1 and the optical device 6. Prior to curing of the adhesive 10, the fibre block assembly 1 and the optical device 6 may be relatively aligned in the directions perpendicular to the optical fibres 3, that is in the directions up and down in FIG. 2 and into and out of the paper. However, the alignment in the direction in which the fibres 3 extend is fixed and may not be adjusted.

Butt coupling is unsuitable when it is important to avoid physical contact between the optical fibre and the optical device. This is the case, for example, with many active optical devices, such as those made of a semiconductor such as indium phosphide. Contact is also undesirable for optical devices having a fragile thin film coat.

SUMMARY OF INVENTION

The purpose of the present invention is to provide for alignment of an array of optical fibres with an optical device which allows alignment in a direction perpendicular to the optical axes of the optical fibres to be achieved more easily and/or which allows adjustment of the alignment along the direction in which the fibres extend.

According to a first aspect of the present invention, there is provided a method of aligning the end of an array of optical fibres with waveguides in an optical device, comprising: mounting the end of the array of optical fibres in a fibre block assembly comprising at least a first block, the first block having an array of grooves in a grooved surface of the block, the optical fibres being mounted in the grooves, the fibre block assembly further having at least one guide surface on the first block on the same side as the grooved surface at a predetermined level with respect to the axes of the array of optical fibres; supporting the optical device on a support surface of a bench, which bench has at least one guide surface extending from the support surface, by the surface of the optical device proximate to the waveguides; aligning the end of an array of optical fibres with the waveguides in the optical device by moving the fibre block assembly with the at least one guide surface of the first block in contact with the at least one guide surface of the bench; and fixing the fibre block assembly to the bench after said aligning of the end of the array of optical fibres with the waveguides in the optical device.

According to a second aspect of the present invention, there is provided a method of aligning the end of an array of optical fibres with waveguides in an optical device, comprising: mounting the end of the array of optical fibres in a fibre block assembly comprising a first block having an array of grooves in a grooved surface of the first block and a second block fixed to the first block with a surface having no grooves facing the grooved surface of the first block and with the fibres mounted between the blocks in the grooves, the fibre block assembly further having at least one guide surface on the second block on the same side as said surface facing the grooved surface of the first block at a predetermined level with respect to the axes of the array of optical fibres; supporting the optical device on a support surface of a bench, which bench has at least one guide surface extending from the support surface, by the surface of the optical device proximate to the waveguides; aligning the end of an array of optical fibres with the waveguides in the optical device by moving the fibre block assembly with the at least one guide surface of the first block in contact with the at least one guide surface of the bench; and fixing the fibre block assembly to the bench after said aligning of the end of the array of optical fibres with the waveguides in the optical device.

According to a third aspect of the invention, there is provided a coupling assembly optically coupling an array of fibres to an optical device, comprising: the optical device having a plurality of waveguides and having a surface proximate to the waveguides at a predetermined level with respect to the axes of the waveguides; a fibre block assembly mounting the end of the array of optical fibres, the fibre block assembly comprising at least a first block, the first block having a grooved surface defining an array of grooves, the optical fibres being mounted in the grooves, the fibre block assembly further having at least one guide surface on the first block on the same side as the grooved surface at a predetermined level with respect to the axes of the array of optical fibres; and a bench having a support surface on which the optical device is fixed by the surface of the optical device proximate to the waveguides, and at least one guide surface extending from the support surface, at a predetermined level with respect to the support surface, the at least one guide surface of the bench having the fibre block assembly fixed thereon by the at least one guide surface of the fibre block assembly, with the array of optical fibres aligned with the plurality of waveguides of the optical device.

According to a fourth aspect of the invention, there is provided a coupling assembly optically coupling an array of fibres to an optical device, comprising: the optical device having a plurality of waveguides and having a surface proximate the waveguides at a predetermined level with respect to the axes of the waveguides; a fibre block assembly mounting the end of the array of optical fibres, the fibre block assembly comprising at least a first block having a grooved surface defining an array of grooves and a second block fixed to the first block with a surface having no grooves facing the grooved surface of the first block and with the optical fibres mounted between the blocks in the grooves, the fibre block assembly further having at least one guide surface on the same side as said surface facing the grooved surface of the first block at a predetermined level with respect to the axes of the array of optical fibres; and a bench having a support surface on which the optical device is fixed by the surface of the optical device proximate to the waveguides, and at least one guide surface extending from the support surface, at a predetermined level with respect to the support surface, the at least one guide surface of the bench having the fibre block assembly fixed thereon by the at least one guide surface of the fibre block assembly with the array of optical fibres aligned with the plurality of waveguides of the optical device.

The provision of at least one guide surface on the fibre block assembly and the bench assists alignment in a direction perpendicular to the optical axes of the optical fibres because the contact between the guide surfaces fixes the alignment in one direction perpendicular to the optical axes of the optical fibres. The alignment is achieved simply by bringing the guide surfaces into contact without any active adjustment being necessary.

Also, the provision of guide surfaces allows the alignment of the end of the array of optical fibres to be adjusted in the direction along which the fibres extend. The contact between the guide surfaces allows the fibre block assembly to be guided along the bench in a controlled manner during the alignment process. The method also allows the alignment of the array of optical fibres to be adjusted laterally of the array, that is in the direction in which the array repeats. Accordingly, the method allows the end of the array of fibres to be positioned and subsequently fixed at a position in close proximity to the optical device but without physical contact. This is a particular advantage in the case of active semiconductor optical devices and other devices which are fragile, for example because of the presence of an optical thin film. Nonetheless the method may be used with any type of optical device. The method allows the optical fibres and the optical device to be butt coupled in which case the primary advantage is the fixing of alignment in one direction by the contact between the guide surfaces.

The vertical position of the array of optical fibres relative to the optical device, that is perpendicular to the direction of the optical axes of the fibres and to the direction in which the array repeats, is fixed by the contact between the guide surfaces of the fibre block assembly and the bench. To achieve vertical alignment, preferably the axes of the waveguides of the optical device are at a distance relative to the surface of the optical device on which the optical device is supported on the bench equal to the sum of the distance, if any, of the axes of the optical fibres relative to the at least one guide surface of the fibre block assembly plus the distance, if any, of the guide surface of the bench relative to the support surface.

The distance of the axes of the waveguides relative to the proximate surface of the optical device is known, because this may be controlled during manufacture of the optical device. The distance of the axes of the optical fibres relative to the at least one guide surface of the fibre block assembly and the distances of the at least one guide surface of the bench relative to the support surface may be controlled by suitable design of the fibre block assembly and the bench. This is particularly easy for the assembly if it is formed on the same side as the grooved surface, for example by being the grooved surface, or by being offset by a known amount from the grooved surface, e.g. by being etched from, or deposited on, the grooved surface. In particular, it is possible to control these distances to achieve vertical alignment with a desirable tolerance of at least ±0.5 μm.

The use of a bench as an intermediate element between the fibre block assembly and the optical device allows accommodation of any difference between (a) the distance, if any, of the axes of the optical fibres relative to the at least one guide surface of the fibre block assembly and (b) the distance of the axes of the waveguides from the surface on which the optical device is supported. This may be achieved simply by selection of the distance between the support surface and the at least one guide surface of the bench. Thus the use of a bench as a separate intermediate element greatly eases the alignment process and avoids any need to provide either one of the optical device and the fibre block assembly with any complicated structures for aligning the optical fibres with the waveguides of the optical device.

BRIEF DESCRIPTION OF DRAWINGS

To allow better understanding, embodiments of the present invention will now be described by way of non-limitative example with reference to the accompanying drawings in which.

DETAILED DESCRIPTION OF PREFERRED EMBODIMENTS

Figure 3:
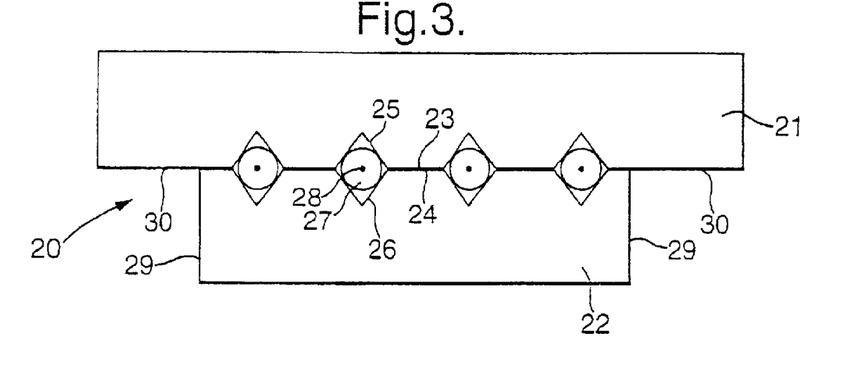
FIG. 3 is an end view of a fibre block in accordance with the present invention.

A fibre block assembly 20 in accordance with the present invention is shown in end view in FIG. 3. The fibre block assembly 20 comprises a first block 21 and a second block 22 mounted together with opposed surfaces 23 and 24 of the respective blocks 21 and 22 facing one another and in contact. The surface 23 of the first block 21 is grooved with an array of parallel grooves 25. The opposed surface 24 of the second block 22 is also grooved with an array of grooves 26 matching the array of grooves 25 in the first block 21. The grooves 25 formed in the first block 21 are each aligned with a respective groove 26 in the second block 22. The first and second blocks 21 and 22 are bonded to the fibres 27 with zero thickness bonds (4-point contact), hence effectively bonding the first and second blocks 21 and 22 together.

A linear array of optical fibres 27, for example in the form of ribbon fibre, are mounted in the grooves 25 and 26 between the first and second blocks 21 and 22. The first and second blocks 21 and 22 are bonded to the fibres 27 with zero-thickness bonds (4-point contact), hence effectively bonding the first and second blocks 21 and 22 together.

The blocks 21 and 22 are formed from silicon, or any other suitable material. The grooves 25 and 26 are v-grooves which may be formed in a conventional manner by etching to a crystal face or precision grinding which has a similar or better tolerance than etching. This allows the depth of the grooves 25 and 26 to be precisely controlled. In the fibre block assembly 20 of FIG. 3, the grooves 25 in the first block 21 are the same depth as the grooves 26 in the second block 22. As a result, the fibres 27 are aligned with their axes 28 at the level of the opposed, grooved surfaces 23 and 24 of the first and second blocks 21 and 22.

The grooved surface 23 of the first block 21 extends from either side of the array of grooves 25 beyond the sides 29 of the second block 22 to form guide surfaces 30 extending parallel to the axes 28 of the optical fibres 27.

Figure 4:
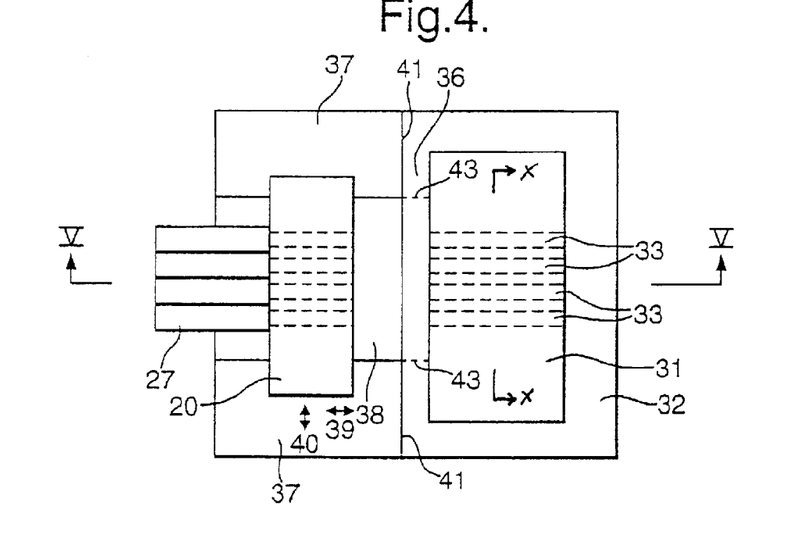
FIG. 4 is a top view of the fibre block of FIG. 3 on a bench supporting an optical device.
Figure 5:
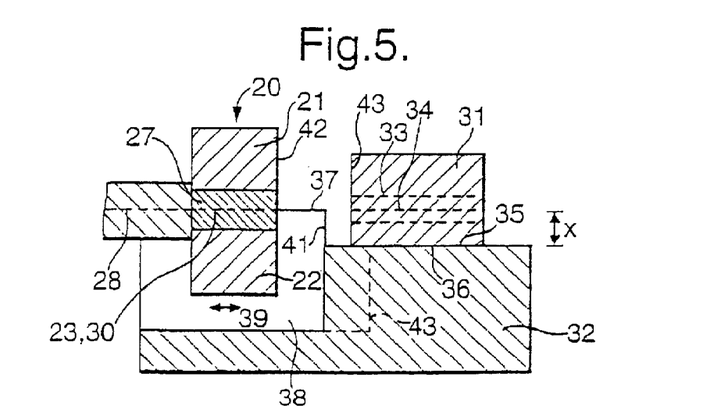
FIG. 5 is a cross-sectional view of the assembly of FIG. 4 taken along the line IV—IV along which the fibres extend.

FIGS. 4 and 5 are a top view and a cross-sectional view, respectively, of the fibre block assembly 20 during alignment with an optical device 31 using a bench 32 (which might sometimes be called a sub-mount or a motherboard).

The optical device 31 has an array of waveguides 33 each centred on a respective axis 34 proximate to a given surface 35 of the optical device 31. The spacing of the waveguides 33 of the optical device is the same as the spacing of the optical fibres 27 in the fibre block assembly 20. The distance x of the axes 34 of the waveguides 33 from the proximate surface 35 is known.

The bench 32 is formed with a support surface 36 on which the optical device 31 is supported by the proximate surface 35, where the optical device 31 is fixed in place.

The optical device 31 may be any type of optical device.

Figure 6:
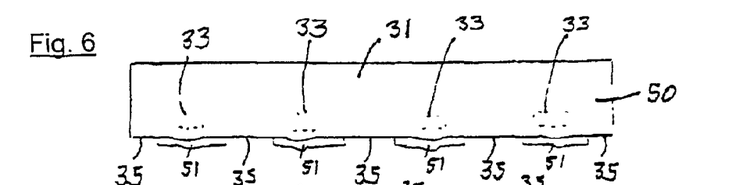
FIG. 6 is an end view of an optical device in the form of an active semiconductor optical device.
Figure 7:
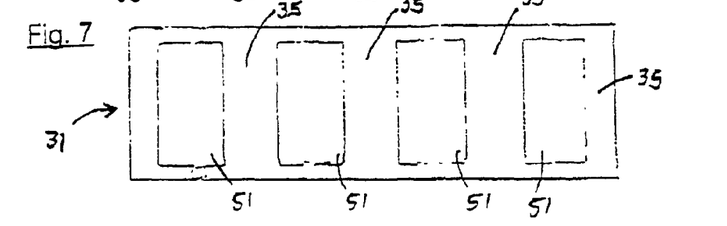
FIG. 7 is a plan view of the side of the optical device of FIG. 6 on which it is supported.
Figure 8:
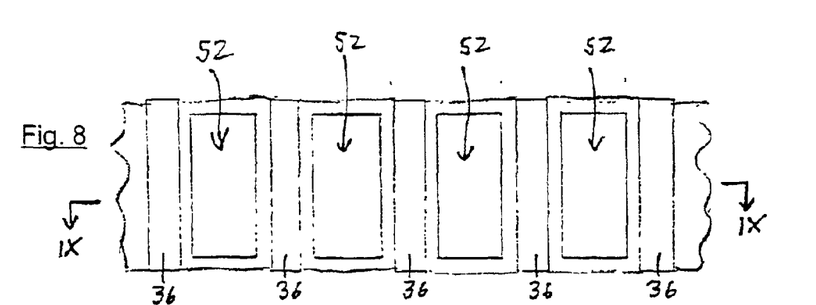
FIG. 8 is a detailed partial plan view of the support surface of the bench used with the optical device of FIG. 6.
Figure 9:
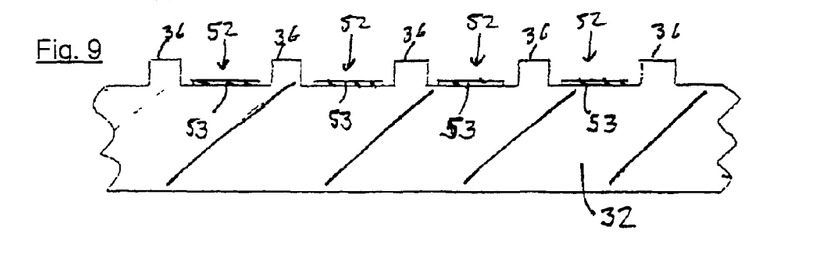
FIG. 9 is a cross-sectional view of the support surface taken along line IX—IX in FIG. 8, which is the same line as X—X in FIG. 4.
Figure 10:
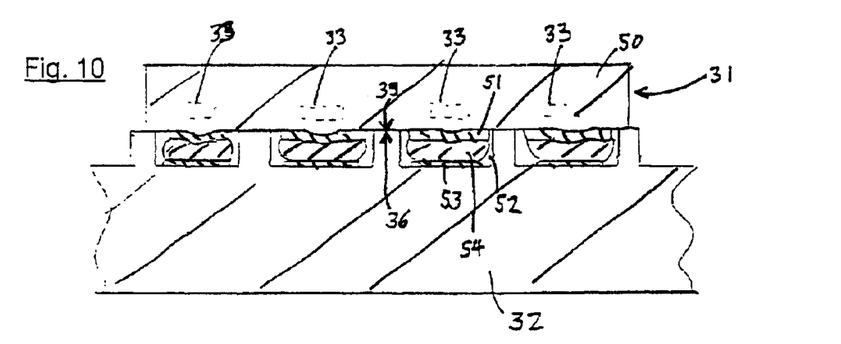
FIG. 10 is a cross-sectional view of the optical device of FIG. 6 supported on the support surface of FIG. 8 taken along line X—X in FIG. 4.

The present invention is particularly applicable to an optical device 31 in the form of an active semiconductor optical device, such as a semiconductor optical amplifier, for example made from indium phosphide. An example of such an optical device 31 in the form of an active semiconductor optical device is illustrated in FIGS. 6 and 7. In this case, the optical device 31 comprises a semiconductor chip 50 manufactured using an epitaxial process, such as chemical vapour deposition (CVD), in which the waveguides 33 are formed by a deposition of successive layers. The proximate surface 35 is a surface of the semiconductor chip 50. As the optical device 31 is an active semiconductor optical device, it additionally has electrodes 51 formed on the proximate surface 35 of the semiconductor chip 50. Usually, the thickness of the electrodes 51 is not known to the accuracy required for passive alignment. Therefore, the support surface 36 of the bench 32 is arranged as illustrated in FIGS. 8 and 9. In particular, to prevent the optical device 31 being supported by the electrodes 51, the support surface 36 is additionally provided with wells 52 of sufficient size to accommodate the electrodes 51. Thus, when the optical device 31 is arranged on the bench 32 as illustrated in FIG. 10, the electrodes 51 fit in the wells 52 and the proximate surface 35 of the semiconductor chip is supported by the support surface 36. Also, in the wells 52, the bench 32 is provided with contact pads 53. During alignment of the optical device 31 of the bench 32, molten solder 54 is present in the wells which, after solidifying, provides an electrical contact between contact pads 53 and the electrodes 51 of the optical device 31. This allows the contact pads 53 to be used to apply operating currents to the electrodes 51.

However, the optical device 31 may also be a passive waveguide structure, such as a silica-on-silicon, silicon or polymer structure. In this case, the optical device 31 is again manufactured by a deposition process in which the waveguides 33 are formed by a deposition of successive layers.

In such manufacturing processes involving the deposition of layers, the deposition occurs in a controlled manner, so the distance of the axes 34 from the proximate surface 35 formed by the outer deposited layer is precisely known. Accordingly, the axes of the waveguides 33 are a known distance relative to the support surface 36 of the bench 32.

The bench 32 is further formed with a pair of guide surfaces 37 which extend parallel to one another from the support surface 36 in front of the optical device 31. Between the guide surfaces 37, the bench 32 is formed with a recess 38 so that there is a gap between the guide surfaces 37.

For alignment of the fibre block assembly 20 with the optical device 31, the fibre block assembly is placed with its guide surfaces 30 contacting the guide surfaces 37 of the bench 32. The gap between the guide surfaces 37 is wider than the length of the block 22 between its sides 29. Accordingly, the second block 22 of the fibre block assembly 20 fits in the gap between the guide surfaces 37 of the bench 32 without contacting the bench 32. In contrast, the guide surfaces 30 of the first block of the fibre block assembly 20 extend by a sufficient distance that they overlap the guide surfaces 37 of the bench 32.

The end of the array of optical fibres 3 is aligned with the waveguides 33 in the optical device 31 by moving the fibre block assembly 20 with respect to the bench 32 whilst keeping the guide surfaces 30 of the fibre block assembly 20 in contact with the guide surfaces 37 of the bench 32. This contact allows the fibre block assembly 20 to be slid in a controlled manner during the alignment process. In particular, it allows adjustment in the direction 39 along which the optical fibres extend. It also allows adjustment in the lateral direction 40, that is the direction in which the array of optical fibres 27 repeats. Consequently, the fibre block assembly 20 may be aligned with the ends of optical fibres 27 in close proximity to the optical device 31 but without physical contact.

The alignment may be optimised in a conventional manner, for example by supplying power through either the optical fibres 27 or the optical device 31 and detecting the power output to the other one of the optical fibres 27 and the optical device 31. After alignment, the fibre block assembly 20 is fixed to the bench 32. The fixing may occur in numerous ways, for example by bonding with glue between the guide surfaces 30 and 37 or with glue applied through the recess 38 or through channels (not shown) in either or both of guide surfaces 30 or 37, or by butt coupling.

After such fixing, the fibre block assembly 20, the bench 32 and the optical device 31 together form coupling assembly in which the optical fibres 27 are optically coupled to the waveguides 33 of the optical device 31.

The contact between the guide surfaces 30 and 37 fixes the vertical movement of the fibre block assembly 20 with respect to the bench 32, that is in the direction perpendicular to the axes 28 of the optical fibres 27 and the guide surfaces 30 and also perpendicular to the direction in which the array of fibres 27 repeats. As the axes 28 of the optical fibres 27 are at the same level as the guide surfaces 30, vertical alignment with the waveguides 33 is achieved by the bench 32 being formed with a step 41 between the support surface 36 and the guide surfaces 37 of the bench 32. The step 41 has the same height as the distance x between the axes 34 of the waveguides 33 relative to the proximate surface 35 of the optical device 31. As a result, the axis 28 of the optical fibres 27 is at the same level as the axes 34 of the waveguides 33 and the optical device 31.

The height of the step 41 may be precisely controlled during manufacture of the bench 32. For example, the support surface 36, the guide surfaces 37 and the recess 38 of the bench 32 may be formed by etching the bench 32 from a piece of silicon. Such etching allows accurate control of the relative levels of the support surface 36 and the guide surfaces 37.

Optionally, the optical device 31 overlays the support surface 36, for example by extending the recess 38 to the position indicated by the dotted lines 43. This is to ensure the bench 32 does not limit the progress of the fibre block assembly 20 towards the optical device 31.

Numerous modifications to the embodiment described above are envisaged. For example, the following modifications may be made, although these are not exhaustive.

Some of the modifications are described with reference to further embodiments of the invention. These further embodiments have many features in common with the embodiment as illustrated in FIGS. 3 to 5. For brevity and to highlight the differences, the common features will be given the same reference numerals and the description of those common features will not be repeated.

One possible modification is for the grooves 25 and 26 in the first and second blocks 21 and 22 to be of different depths. This results in a shift of the axes 28 of the optical fibres 27 relative to the guide surfaces 30. The distance of the axes 28 of the optical fibres 27 is nonetheless known precisely, because it is possible to achieve a high degree of control of the depths of the grooves 25 and 26, as previously noted. As an example of this, there will now be described a second embodiment.

Figure 11:
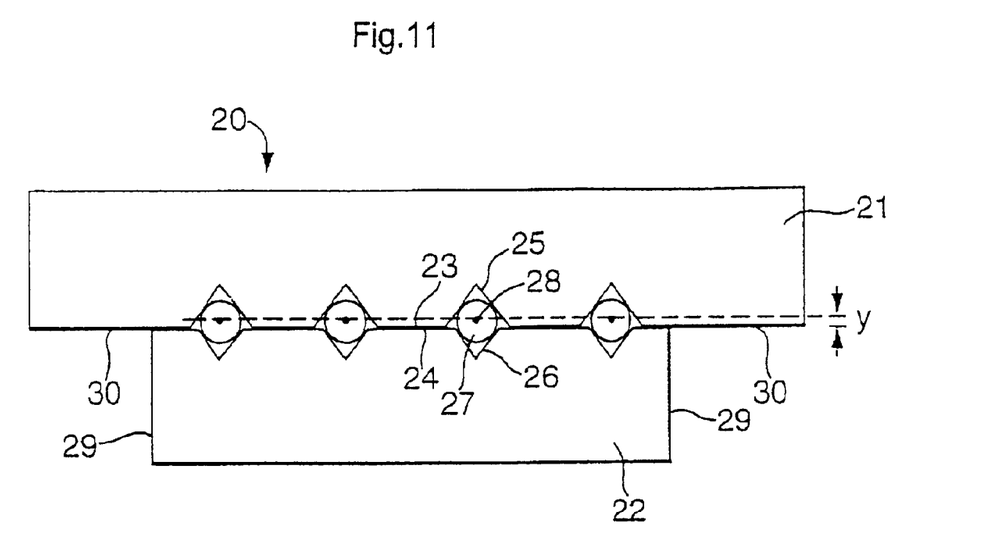
FIG. 11 is an end view of a second fibre block in accordance with the present invention.

The fibre block assembly 20 of the second embodiment is shown in end view in FIG. 11. The difference from the embodiment of FIGS. 3 to 10 is that the grooves 25 formed in the first block 21 have an increased depth, whereas the groove 26 formed in the second block 22 have a reduced depth. As a result, the optical fibres 27 are mounted between the first and second blocks 21 and 22 with their axes 28 at a level a known distance y relative to the guide surfaces 30 of the first block 21.

Figure 12:
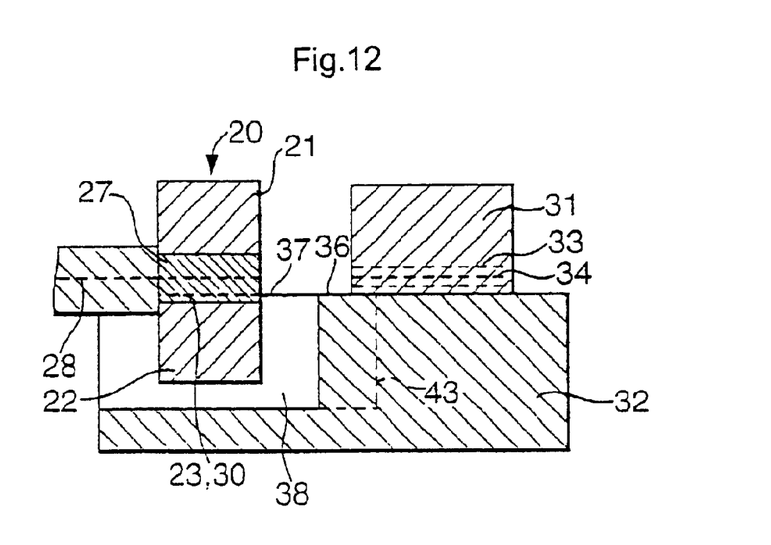
FIG. 12 is a cross-sectional view of the fibre block of FIG. 11 being aligned on a bench supporting an optical component.

FIG. 12 is a cross-sectional view of the second embodiment showing the fibre block assembly 20 positioned on the bench 32. The difference from the embodiment of FIGS. 3 to 5 is that the support surface 36 and guide surfaces 37 of the bench 32 are at the same level without any step in between. Again, the vertical position of the fibre block assembly 20 relative to the optical device 31 is fixed by the contact between the guide surfaces 30 of the fibre block assembly 20 and the guide surfaces 37 of the bench 32.

Vertical alignment of the optical fibres 27 with the waveguides 33 of the optical device 31 is achieved by selecting the distance y of the axes 28 of the optical fibres 27 from the guide surfaces 30 to be equal to the distance of the axes 34 of the waveguides 33 relative to the proximate surface 35 of the optical device 31.

In the limit, the depth of the grooves may be reduced to the point that one or other of the first and second blocks 21 and 22 has no grooves at all. Such an arrangement is particularly suitable for holding a narrow fibre (for example with a typical diameter of 80 $\mu$m) to allow it to be accommodated in a single groove. As an example of this, there will now be described a third embodiment for which the fibre block assembly 20 is shown in end view in FIG. 13.

In the third embodiment, the grooves 26 formed in the second block 22 are of sufficient size to accommodate the optical fibres 27, and no grooves are formed in the first block 21. The optical fibres 27 are mounted in the grooves 26 in the second block 22 between the first and second blocks 21 and 22. The optical fibres 27 contact the lower surface 44 of the first block 21 (which corresponds to the grooved surface 23 of the first embodiment illustrated in FIG. 3, but is not grooved). The guide surfaces 30 are formed by the portions of the ungrooved surface 44 which extend beyond the sides 29 of the second block 22. Due to the contact between the optical fibres 27 and the ungrooved surface 44, the distance y between the axes 28 of the optical fibres 27 and the guide surfaces 30 is known. The fibre block assembly 20 of the third embodiment shown in FIG. 13 may be positioned on a bench 32 in which the guide surfaces 37 of the bench 32 are above the support surface 36, as illustrated in FIGS. 4 and 5.

Figure 13:
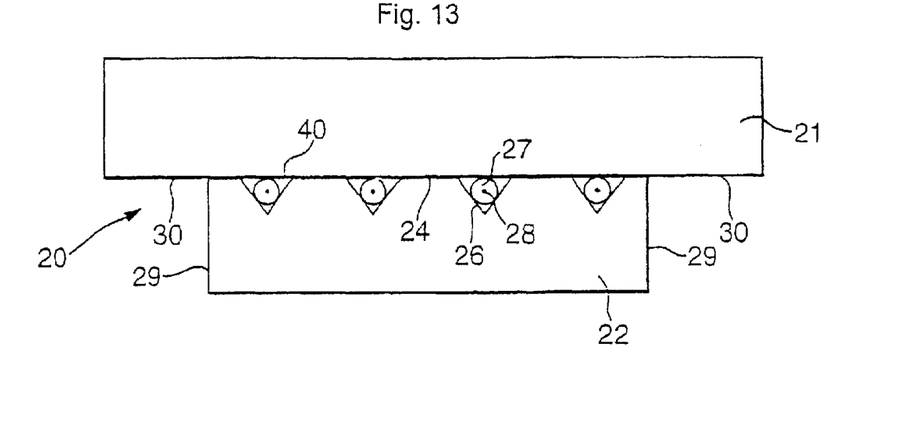
FIG. 13 is an end view of a third fibre block in accordance with the present invention.

In general, the vertical alignment of optical fibres 27 of the waveguides 33 of the optical device 31 may be controlled by varying both (1) the level of the axes 28 of the optical fibres 27 with respect to the guide surfaces 30, which may be varied, for example, as in the second embodiment of FIGS. 11 and 12 or in the third embodiment of FIG. 13, and (2) the distance between the support surface 36 and the guide surfaces 37 of the bench 32. For example, the support surface 36 may be higher than the guide surfaces 37, in contrast to the first embodiment of FIGS. 3 to 10.

Also, in practical embodiments there is likely to be a slight gap between the first block 21 and the second block 22. In that case, the alignment of the axes 28 of the fibres 27 with respect to the guide surfaces 30 is fixed by the depth of the grooves 25 in the first block 21 due to the contact between those grooves 25 and the fibres 27. For example, the axes 28 of the fibres 27 will be half-way across the gap if the grooves 25 and 26 in the two blocks 21 and 22 are identically sized.

In general, vertical alignment is achieved when the sum of the distance, if any, of the axes 28 of the optical fibres 27 relative to the guide surfaces 30 of the first block 21 plus the distance, if any, of the guide surfaces of the bench 32 relative to the support surface 36 is equal to the distance of the axes 34 of the waveguides 33 from the proximate surface 35 of the optical device 31. In practice, these distances may be sufficiently controlled to provide accurate vertical alignment. Typical tolerances achievable are of the order ±0.5 $\mu$m. Errors which do occur are largely due to eccentricity of the core of the optical fibres 27 and variation in the diameter of the cladding of the optical fibres 27.

The end face 42 of the fibre block assembly 20 and the end face 43 of the optical device 31 may be angled in a conventional manner with respect to the direction along which the optical fibres 28 extend, for example across the array of fibres 28 or in the vertical direction.

Another possible modification is to omit the second block 22 from the fibre block assembly 20. However, the presence of the second block 22 is preferred because the second block 22 assists in accurate positioning of the optical fibres 27 in the fibre block assembly 20 due to the contact between the second block 22 and the fibres 27.

Other surfaces than the grooved surface 23 of the first block 21 could be used as the guide surfaces of the fibre block assembly 20. However it is preferred to use the grooved surface 23 because this is easy to manufacture simply by making the first block 21 wider than the second block 22.

In principle the outside surface of one of the blocks could be used as a guide surface, but this is undesirable, because it is difficult to accurately determine the distance between the grooved surfaces 23 and 24 of the first and second blocks 21 and 22 and the outer surface of the blocks 21 and 22. This is because the thickness of the first and second blocks 21 and 22 is typically 500 μm with an error of ±50 μm which is very high compared to the required tolerance of the alignment.

Although it is preferred that the guide surfaces of the fibre block assembly 20 are formed by portions of the grooved surface 23 of the first block 21, it is possible for the guide surfaces of the fibre block assembly 20 to be offset from the grooved surface 23 of the first block 21 (or the ungrooved surface 44) for example by forming the guide surfaces of the fibre block assembly 20 by recesses or protrusions formed on the grooved surface 23 (or ungrooved surface 44). Of course, the formation of the recesses or grooves introduces an extra degree of error into the vertical alignment between the optical fibres 28 and the waveguides 33 of the optical device 31. However, since the guide surfaces remain on the same side of the first block 21 as the grooved surface 23 (or the ungrooved surface 44) it remains possible to provide sufficiently accurate vertical alignment. This is because the necessary degree of control in the formation of the recesses or grooves can be achieved.

Such offset of the guide surface of the fibre block assembly 20 from the grooved surface 23 of the first block 21 is useful for allowing correction of batches of piece parts which have been manufactured out of tolerance, or for ensuring that the depth of the grooves 23 and 24 is adequate to ensure proper location of the optical fibres 27. As examples of this, fourth and fifth embodiments will be described, for which end views of the fibre block assembly 20 are shown in FIGS. 14 and 15 respectively.

Figure 14:
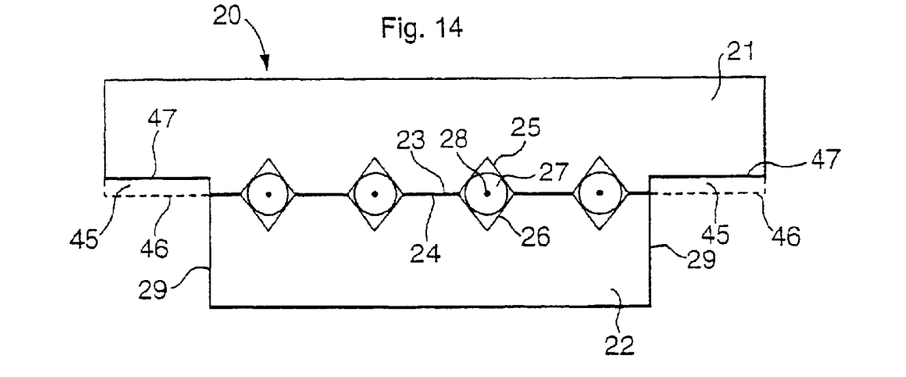
FIG. 14 is an end view of a fourth fibre block in accordance with the present invention.

In the fourth embodiment of FIG. 14, recesses 45 are formed in the portions of the grooved surface 23 of the first block 21 which extend on either side 29 of the second block 22. The recesses 45 are below the level of the grooved surfaces 23 which form the guide surfaces 30 in the first embodiment of FIG. 3, as shown by the dotted line 46. Thus guide surfaces 47 are formed by the bases of the recesses 45. These guide surfaces 47 are thus on the same side of the first block 21 as the grooved surface 23 and extend on either side 29 of the second block 22. The recesses 45 are formed by a process which allows the distance between the guide surface 47 and the axes 28 of the optical fibres 27 to be controlled to a sufficient tolerance. The recesses 45 may be produced by etching. Sufficient knowledge of the depth of the recess 5 may be obtained by a number of methods including but not limited to timed etches, use of an etch stop within the material or in processed measurement of the etched depth. As an alternative, the recess 45 may be produced by mechanical machining, such as grinding. Using appropriate mechanical equipment, an accuracy of 0.1 μm or better can be achieved.

Figure 15:
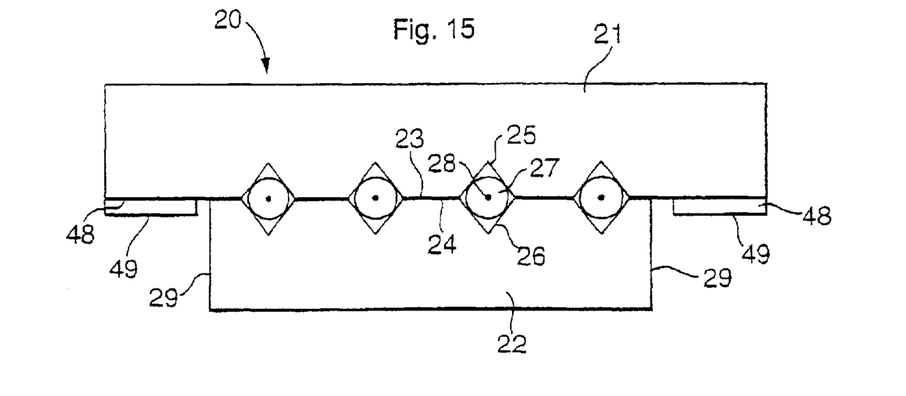
FIG. 15 is an end view of a fifth fibre block in accordance with the present invention.

FIG. 15 demonstrates a fourth embodiment in which an additional layer 48 is deposited on the portions of the grooved surface 23 of the first block 21 which extend on either side 29 of the second block 22 (and which form the guide surface 30 of the first embodiment of FIG. 3). Thus, guide surfaces 49 are formed by the outer surfaces of each layer 48 extending on either side 29 of the second block 22 on the same side of the first block 21 as the grooved surface 23. The layers 48 are formed by a process which allows the height of the layers 48 to be accurately known, so that the distance between the guide surfaces 49 and the axes 28 of the optical fibres 27 is similarly known. For example, the layers 48 may be produced by depositing layers by sputtering, evaporation or chemical vapour deposition (CVD) including LPCVD and PECVD. Alternatively, a spacer layer of the type made on an adhesive filled with spherical beads having a known and controlled upper diameter, as is known from work on liquid crystals. Such beads are available with a diameter precision of 0.05 μm.

The fibre block assemblies 20 of FIGS. 14 and 15 may be positioned on a bench 32 as illustrated in FIGS. 4 and 5.

Another possible modification is to introduce physical features on the fibre block assembly 20 and/or the bench 32 which constrain the movement of the fibre block assembly 20 with respect to the bench 32. One example of this is for stops (not shown) to be provided on the bench 32 to prevent the fibre block assembly 20 from being moved too close to the optical device 31. Another example is to provide the first block 21 with additional grooves (not shown) extending parallel to the grooves 25 mounting the optical fibres 27 for lateral alignment of fibre block assembly 20 in the direction in which the array of optical fibres 27 repeats, for example by fitting over matching protrusions on the guide surface 37 of the bench 32.

What is claimed is:

1. A method of aligning the end of an array of optical fibres with waveguides in an optical device, comprising:

mounting the end of the array of optical fibres in a fibre block assembly comprising at least a first block, the first block having an array of grooves in a grooved surface of the block, the optical fibres being mounted in the grooves, the fibre block assembly further having at least one guide surface on the first block on the same side as the grooved surface at a predetermined level with respect to the axes of the array of optical fibres;

supporting the optical device on a support surface of a bench, which bench has at least one guide surface extending from the support surface, by a surface of the optical device proximate to the waveguides;

aligning the end of an array of optical fibres with the waveguides in the optical device by moving the fibre block assembly with the at least one guide surface of the first block in contact with the at least one guide surface of the bench; and fixing the fibre block assembly to the bench after said aligning of the end of the array of optical fibres with the waveguides in the optical device.

2. A method according to claim 1, wherein the at least one guide surface of the fibre block assembly comprises two guide surfaces which extend from opposite sides of the array of grooves.

3. A method according to claim 1, wherein the at least one guide surface is formed by portions of the grooved surface.

4. A method according to claim 1, wherein the fibre block assembly further comprises a second block fixed to the first block with a surface of the second block facing the grooved surface of the first block and with the fibres mounted between the blocks.

5. A method according to claim 4, wherein the at least one guide surface on the first block extends beyond the second block.

6. A method according to claim 4, wherein the surface of the second block facing the grooved surface of the first block has an array of grooves which matches the array of grooves in the first block and in which the fibres are mounted.

7. A method according to claim 1, wherein the optical fibres are mounted in the grooves with their axes at the level of the grooved surface.

8. A method according to claim 1, wherein the optical fibres are mounted in the grooves with their axes at a level a predetermined distance from the grooved surface.

9. A method according to claim 1, wherein the at least one guide surfaces of the bench is at the same level as the support surface.

10. A method according to claim 1, wherein the at least one guide surface of the bench is at a level a predetermined distance from the support surface.

11. A method according to claim 1, wherein the at least one guide surface of the bench comprises two surfaces between which the bench has a gap or recess.

12. A method according to claim 1, wherein the waveguides of the optical device are formed by deposited layers and the optical device is supported on the support surface of the bench by the outer deposited surface.

13. A method according to claim 1, further comprising fixing the optical device to the bench.

14. A method according to claim 1, wherein the optical device is an active semiconductor optical device comprising a semiconductor chip and the proximate surface is a surface of the semiconductor chip.

15. A method according to claim 1, wherein the axes of the waveguides of the optical device are at a distance from the surface of the optical device proximate to the waveguides equal to the sum of the distance, if any, of the axes of the optical fibres relative to the at least one guide surface of the first block plus the distance, if any, of the at least one guide surface of the bench relative to the support surface.

16. A coupling assembly optically coupling an array of fibres to an optical device, comprising:

the optical device having a plurality of waveguides and having a surface proximate to the waveguides at a predetermined level with respect to the axes of the waveguides;

a fibre block assembly mounting the end of the array of optical fibres, the fibre block assembly comprising at least a first block, the first block having a grooved surface defining an array of grooves, the optical fibres being mounted in the grooves, the fibre block assembly further having at least one guide surface on the first block on the same side as the grooved surface at a predetermined level with respect to the axes of the array of optical fibres; and a bench having a support surface on which the optical device is fixed by the surface of the optical device proximate to the waveguides, and at least one guide surface extending from the support surface, at a predetermined level with respect to the support surface, the at least one guide surface of the bench having the fibre block assembly fixed thereon by the at least one guide surface of the fibre block assembly, with the array of optical fibres aligned with the plurality of waveguides of the optical device.

17. A coupling assembly according to claim 16, wherein the at least one guide surface of the fibre block assembly comprises two guide surfaces which extend from opposite sides of the array of grooves.

18. A coupling assembly according to claim 16, wherein the at least one guide surface is formed by portions of the grooved surface.

19. A coupling assembly according to claim 16, wherein the fibre block assembly further comprises a second block fixed to the first block with a surface of the second block facing the grooved surface of the first block and with the fibres mounted between the blocks.

20. A coupling assembly according to claim 19, wherein the at least one guide surface of the fibre block assembly is on the first block on the same side as the grooved surface and extending beyond the second block.

21. A coupling assembly according to claim 19, wherein the surface of the second block facing the grooved surface of the first block has an array of grooves matching the array of grooves in the first block and in which the fibres are mounted.

22. A coupling assembly according to claim 16, wherein the optical fibres are mounted in the grooves with their axes at the level of the grooved surface.

23. A coupling assembly according to claim 16, wherein the optical fibres are mounted in the grooves with their axes at a level a predetermined distance from the grooved surface.

24. A coupling assembly according to claim 16, wherein the array of optical fibres forms a ribbon fibre.

25. A coupling assembly according to claim 16, wherein the at least one guide surface of the bench is at the same level as the support surface.

26. A coupling assembly according to claim 16 wherein the at least one guide surface of the bench is at a level a predetermined distance relative to the support surface.

27. A coupling assembly according to claim 16, wherein the at least one guide surface of the bench comprises a pair of surfaces between which the bench has a gap or recess.

28. A coupling assembly according to claim 16, wherein a method according to claim 1, where the waveguides of the optical device are formed by deposited layers and the optical device is supported on the support surface of the bench by the outer deposited surface.

29. A coupling assembly according to claim 16, wherein the optical device is an active semiconductor optical device comprising a semiconductor chip and the proximate surface is a surface of the semiconductor chip.

30. A coupling assembly according to claim 16, wherein the axes of the waveguides of the optical device are at a distance from the surface of the optical device proximate to the waveguides equal to the sum of the distance, if any, of the axes of the optical fibres relative to the at least one guide surface of the first block plus the distance, if any, of the at least one guide surface of the bench relative to the support surface.

31. A method of aligning the end of an array of optical fibres with waveguides in an optical device, comprising:

mounting the end of the array of optical fibres in a fibre block assembly comprising a first block having an array of grooves in a grooved surface of the first block and a second block fixed to the first block with a surface having no grooves facing the grooved surface of the first block and with the fibres mounted between the blocks in the grooves, the fibre block assembly further having at least one guide surface on the second block on the same side as said surface facing the grooved surface of the first block at a predetermined level with respect to the axes of the array of optical fibres;

supporting the optical device on a support surface of a bench, which bench has at least one guide surface extending from the support surface, by a surface of the optical device proximate to the waveguides;

aligning the end of an array of optical fibres with the waveguides in the optical device by moving the fibre block assembly with the at least one guide surface of the first block in contact with the at least one guide surface of the bench; and fixing the fibre block assembly to the bench after said aligning of the end of the array of optical fibres with the waveguides in the optical device.

32. A coupling assembly optically coupling an array of fibres to an optical device, comprising:

the optical device having a plurality of waveguides and having a surface proximate the waveguides at a predetermined level with respect to the axes of the waveguides;

a fibre block assembly mounting the end of the array of optical fibres, the fibre block assembly comprising at least a first block having a grooved surface defining an array of grooves and a second block fixed to the first block with a surface having no grooves facing the grooved surface of the first block and with the optical fibres mounted between the blocks in the grooves, the fibre block assembly further having at least one guide surface on the same side as said surface facing the grooved surface of the first block at a predetermined level with respect to the axes of the array of optical fibres; and a bench having a support surface on which the optical device is fixed by the surface of the optical device proximate to the waveguides, and at least one guide surface extending from the support surface, at a predetermined level with respect to the support surface, the at least one guide surface of the bench having the fibre block assembly fixed thereon by the at least one guide surface of the fibre block assembly with the array of optical fibres aligned with the plurality of waveguides of the optical device.

33. A method of aligning the end of an array of optical fibres with waveguides in an optical device, comprising:

mounting the end of the array of optical fibres in a fibre block assembly comprising at least a first block, the first block having an array of grooves in a grooved surface of the block, the optical fibres being mounted in the grooves, the fibre block assembly further having at least one guide surface at a predetermined level with respect to the axes of the array of optical fibres;

supporting the optical device on a support surface of a bench having guide surfaces extending from the support surface; and aligning the end of an array of optical fibres with the waveguides in the optical device by moving the fibre block assembly with the guide surfaces of the first block in contact with the guide surfaces of the bench.

34. A coupling assembly optically coupling an array of fibres to an optical device, comprising:

the optical device having a plurality of waveguides;

a fibre block assembly mounting the end of the array of optical fibres, the fibre block assembly comprising at least a first block, the first block having a grooved surface defining an array of grooves, the optical fibres being mounted in the grooves, the fibre block assembly further having at least one guide surface at a predetermined level with respect to the axes of the array of optical fibres; and a bench having a support surface supporting the optical device by a surface of the optical device at a predetermined level relative to the axes of the waveguides, and at least one guide surface extending from the support surface, at a predetermined level with respect to the support surface, the at least one guide surface of the bench supporting the at least one guide surface of the fibre block assembly with the array of optical fibres aligned with the plurality of waveguides of the optical device.

35. A coupling assembly according to claim 34, wherein the at least one guide surface of the fibre block assembly is on the first block.

36. A coupling assembly according to claim 35, wherein the at least one guide surface of the fibre block assembly is on the first block on the same side as the grooved surface.

37. A coupling assembly according to claim 36, wherein the at least one guide surface of the fibre block assembly comprises two guide surfaces which extend from opposite sides of the array of grooves.

38. A coupling assembly according to claim 36, wherein the at least one guide surface is formed by portions of the grooved surface.

39. A coupling assembly according to claim 36, wherein the at least one guide surface of the bench is at a level a predetermined distance relative to the support surface.

40. A coupling assembly according to claim 34, wherein the fibre block assembly further comprises a second block fixed to the first block with a surface of the second block facing the grooved surface of the first block and with the fibres mounted between the blocks.

41. A coupling assembly according to claim 40, wherein the at least one guide surface of the fibre block assembly is on the first block on the same side as the grooved surface and extending beyond the second block.

42. A coupling assembly according to claim 40, wherein the second block has no grooves on the surface facing the grooved surface of the first block and the at least one guide surface is formed on the second block on the same side as said surface facing the grooved surface of the first block.

43. A fibre block assembly according to claim 40, wherein the surface of the second block facing the grooved surface of the first block has an array of grooves matching the array of grooves in the first block and in which the fibres are mounted.

44. A fibre block assembly according to claim 34, wherein the optical fibres are mounted in the grooves with their axes at the level of the grooved surface.

45. A fibre block assembly according to claim 34, wherein the optical fibres are mounted in the grooves with their axes at a level a predetermined distance from the grooved surface.

46. A fibre block assembly according to claim 34, wherein the array of optical fibres forms a ribbon fibre.

47. A coupling assembly according to claim 34, wherein the at least one guide surface of the bench is at the same level as the support surface.

48. A coupling assembly according to claim 34, wherein the at least one guide surface of the bench comprises a pair of surfaces between which the bench has a gap or recess.

49. A coupling assembly according to claim 34, wherein the optical device is an active semiconductor optical device.

50. A coupling assembly according to claim 34, wherein the axes of the waveguides of the optical device are at a distance from the surface of the optical device on which the optical device is supported equal to the sum of the distance, if any, of the axes of the optical fibres relative to the at least one guide surface of the first block plus the distance, if any, of the at least one guide surface of the bench relative to the support surface.

51. A coupling assembly according to claim 34, wherein the waveguides of the optical device are formed by deposited layers and the optical device is supported on the support surface of the bench by the outer deposited surface.

52. A coupling assembly according to claim 34, wherein the support surface of the bench supports the optical device by a surface of the optical device proximate to the waveguides.

53. A coupling assembly according to claim 52, wherein the optical device is an active semiconductor optical device comprising a semiconductor chip and the proximate surface is a surface of the semiconductor chip.

54. A coupling assembly according to claim 34, wherein the optical device is fixed on the support surface of the bench.

55. A coupling assembly according to claim 34, wherein the fibre block assembly is fixed on the at least one guide surface of the bench.

* * * * *